(12) United States Patent
Li et al.

(10) Patent No.: US 8,146,435 B1
(45) Date of Patent: Apr. 3, 2012

(54) DIFFERENTIAL PRESSURE GAUGE

(75) Inventors: Yanfeng Li, Beijing (CN); Hongya Li, Beijing (CN)

(73) Assignee: Sailsors Instruments Ltd., Beijing, Beijing (CN)

( * ) Notice: Subject to any disclaimer, the term of this patent is extended or adjusted under 35 U.S.C. 154(b) by 0 days.

(21) Appl. No.: 12/906,114

(22) Filed: Oct. 17, 2010

(51) Int. Cl.
*G01L 13/02* (2006.01)
(52) U.S. Cl. .......................................... 73/716; 73/736
(58) Field of Classification Search .................. None
See application file for complete search history.

(56) References Cited

U.S. PATENT DOCUMENTS

| | | | | |
|---|---|---|---|---|
| 4,011,759 A | * | 3/1977 | Phillips et al. | 73/716 |
| 4,030,365 A | * | 6/1977 | Phillips et al. | 73/708 |
| 4,347,744 A | * | 9/1982 | Buchanan | 73/715 |
| 4,374,475 A | * | 2/1983 | Hestich | 73/736 |
| 4,778,159 A | * | 10/1988 | Cooper | 267/151 |
| 4,827,095 A | * | 5/1989 | Clark et al. | 200/83 J |
| 4,890,497 A | * | 1/1990 | Cahill | 73/708 |
| 6,981,421 B2 | * | 1/2006 | Palmer et al. | 73/735 |
| 7,752,993 B2 | * | 7/2010 | Gordon | 116/267 |
| 2004/0237660 A1 | * | 12/2004 | Palmer et al. | 73/735 |

* cited by examiner

*Primary Examiner* — Andre Allen

(57) ABSTRACT

A differential pressure gauge includes a housing, a leaf spring having a magnetic steel, a measuring diaphragm, a helix, a dial, a range adjusting device and a diaphragm cover. The measuring diaphragm is connected with the leaf spring by connectors. The range adjusting device includes an adjusting spring provided at a lower end of the measuring diaphragm, a balance spring provided at an upper end of the measuring diaphragm, an adjusting screw and a slider which are provided at a lower end of the adjusting spring. The adjusting end of the adjusting screw is provided outside of the housing. The adjusting spring can be compressed by the upper and lower displacement of the slider driven by the adjusting screw, thus affecting the rigidity of the system to change the range of the differential pressure gauge. The differential pressure gauge facilitates adjusting the range and has the accurate measurement.

12 Claims, 8 Drawing Sheets

DIFFERENTIAL PRESSURE GAUGE

BACKGROUND OF THE PRESENT INVENTION

1. Field of Invention

The present invention relates to a differential pressure gauge.

2. Description of Related Arts

Mechanical differential pressure gauge is an elastic pressure gauge which makes use of easy and frictionless magnetic spiral movement and measures by the rubber diaphragm as the sensing element. When the differential pressure (including positive and negative pressure) acts on the diaphragm, the diaphragm will be out of shape to displace the center thereof. Connector drives the leaf spring which has the magnetic steel to move. Under the magnetic induction, the helix, which has the pointer thereon, will turn around so that the pointer will indicate the pressure value to achieve the aim of measurement.

FIGS. 1 and 2 show a conventional differential pressure gauge whose housing 3 is round. Its helix 6 uses the independent bracket. The central axis of the measuring diaphragm 4 and the leaf spring 1 are connected by the double end stud and a small compression spring. The range adjustment of the conventional differential pressure gauge makes use of the C-shaped clip 2 on the leaf spring. The displacement of the C-shaped clip on the leaf spring will affect the length of the cantilever of the leaf spring to affect the rigidity of the leaf spring so that the range of the differential pressure gauge will change. The measuring diaphragm 4 is connected with the leaf spring 1 which has the magnetic steel 5 by the connector. When the differential pressure acts on the measuring diaphragm 4, the diaphragm 4 will be out of shape to displace its center. With the movement of the leaf spring 1 which has the magnetic steel 5 thereon, the helix 6 will turn around under the magnetic induction so that the pointer can indicate the pressure value.

Under the existing technology to produce the traditional differential pressure gauge, the bracket of the independent helix will incline while zero adjustment. This will affect the measuring accuracy of the differential pressure gauge. Its connection of the diaphragm's central axis and the leaf spring will affect the movement of the diaphragm so that it can not be reacted correctly. It will affect the measuring accuracy of the differential pressure gauge. Its way to adjust the range is complex and the adjusting point is inside of the differential pressure gauge. After the differential pressure gauge has been used for some time, it needs to be re-calibrated. Users can not calibrate it themselves, so users need to send the gauge back to factory. It's troublesome.

SUMMARY OF THE PRESENT INVENTION

An object of the present invention is to provide a differential pressure gauge, which adopts the double-spring balance principle, thereby effectively eliminating the problems of zero drift and linear difference which are produced by the single spring.

Another object of the present invention is to provide a differential pressure gauge, wherein the diaphragm center is pin hingedly connected with the leaf spring, thereby effectively eliminating the measuring error which is produced by the transmission error.

Another object of the present invention is to provide a differential pressure gauge, wherein the high-integrated structure of the diaphragm cover can effectively ensure that the helix and the axis of the measuring diaphragm are parallel, thereby ensuring the measuring accuracy of the differential pressure gauge.

Another object of the present invention is to provide a differential pressure gauge, wherein the sealing gasket at the back of the front flange can directly and effectively seal up with the wall, thereby users can install easily.

Accordingly, in order to accomplish the above objects, the present invention provides a differential pressure gauge comprising:

a housing having a pressure nozzle thereon;

a leaf spring, having a magnetic steel, provided within the housing;

a measuring diaphragm connected with the leaf spring and provided within the housing;

a helix, having a pointer, provided within the housing;

a dial provided within the housing;

a range adjusting device, for adjusting a range of the differential pressure gauge, provided on the leaf spring, wherein the range adjusting device comprises:

an adjusting spring provided at a lower end of the measuring diaphragm;

a balance spring provided at an upper end of the measuring diaphragm;

an adjusting screw provided at a lower end of the adjusting spring, wherein an adjusting end of the adjusting screw is provided outside of the housing; and a slider provided at a lower end of the adjusting spring; and a diaphragm cover provided at an upper end of the balance spring, whereby, when a differential pressure acts on the measuring diaphragm, the diaphragm will be out of shape to displace a center thereof, with a movement of the leaf spring having the magnetic steel, the helix having the pointer will turn around under a magnetic induction so that the pointer indicates a pressure value.

Preferably, the measuring diaphragm is integrated, the rigidity center and the measuring diaphragm are made to be an integral whole, and a center of the measuring diaphragm is pin hingedly connected with the leaf spring. The pin is hingedly connected with the leaf spring at the top end of the central structure of the integrated measuring diaphragm, and no traditional small connecting compression spring exists.

Preferably, the diaphragm cover, a bracket of the helix and a bracket of the dial are made to be an integral whole.

Preferably, the differential pressure gauge further comprises a transparent cover, an adjustable signal flag fixed on the transparent cover, a front flange, a sealing gasket provided at a back of the front flange, and a clamp hook, wherein the housing is sealed with the transparent cover by the clamp hook, and the housing has four push-on pressure nozzles thereon.

In the present invention, the housing is square in front and round at back, wherein the front end is an end at which the transparent cover is provided.

In the present invention, the adjusting screw is provided outside of the housing. When the differential pressure gauge has been used for some time, users can easily adjust and calibrate the gauge by themselves. The adjusting screw makes use of its roll to drive the slider. The adjustment is simple, accurate and reliable. The double-spring balance (including the adjusting spring and the balance spring) principle and the pin hinge connection between the diaphragm center and the leaf spring effectively eliminate the measuring error. The high-integrated structure of the diaphragm cover can effectively ensure that the helix and the axis of the measuring diaphragm are parallel, thereby improving the measuring accuracy of the differential pressure gauge.

These and other objectives, features, and advantages of the present invention will become apparent from the following detailed description, the accompanying drawings, and the appended claims.

DETAILED DESCRIPTION OF THE PREFERRED EMBODIMENT

Figure 1:
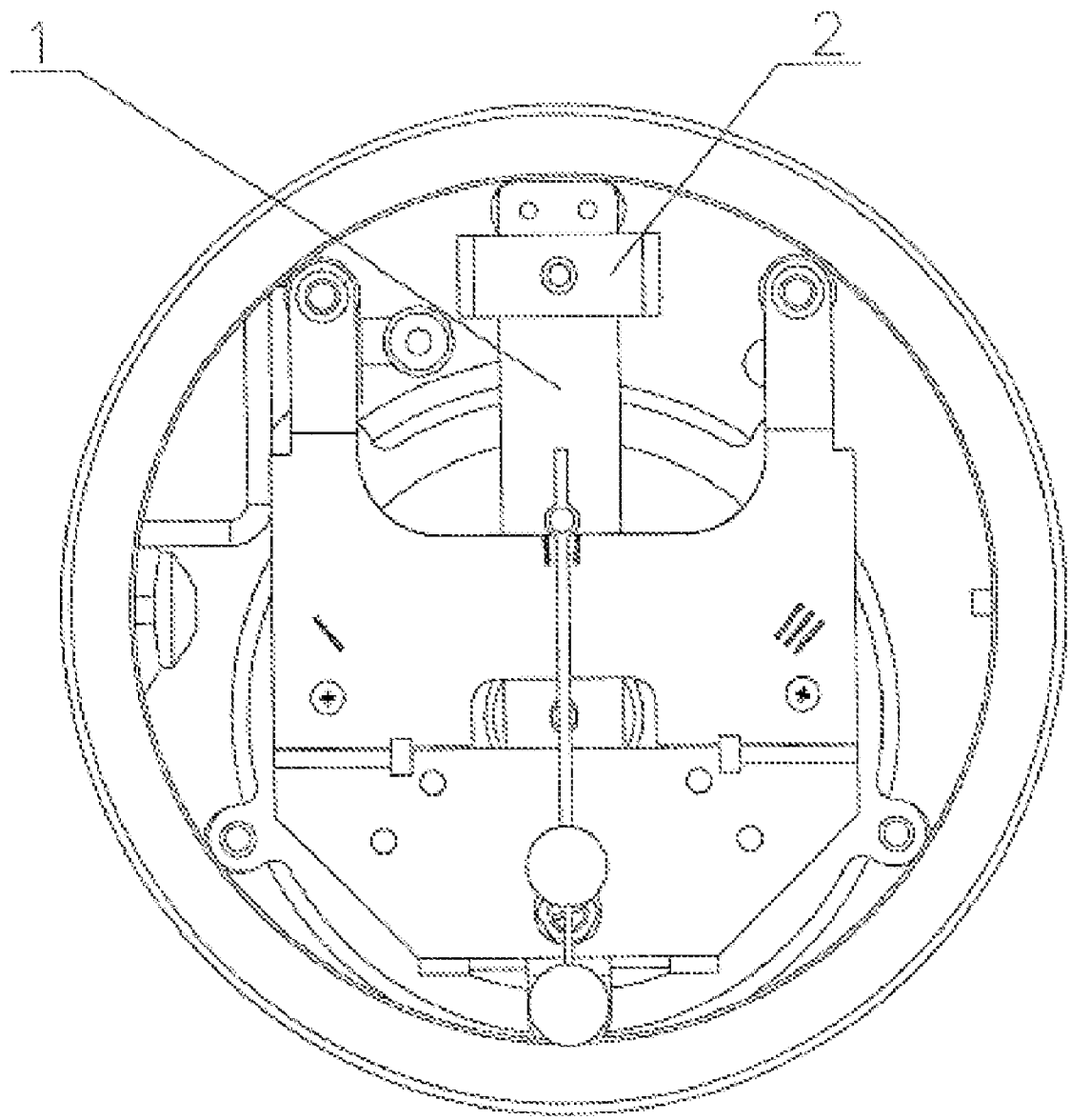
FIG. 1 is a perspective view of a conventional differential pressure gauge.
Figure 2:
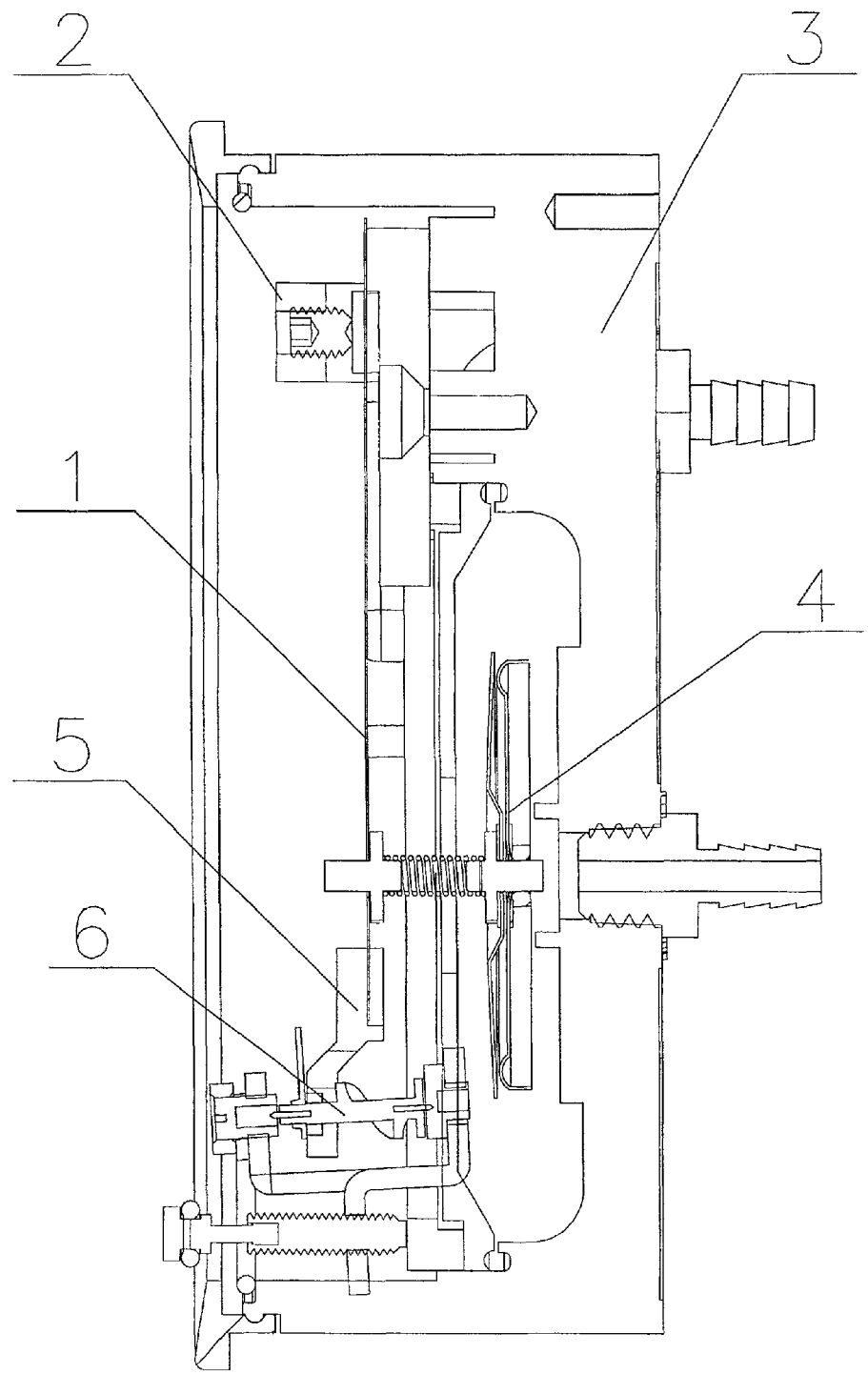
FIG. 2 is a sectional view of the conventional differential pressure gauge.

The present invention is further explained with the accompanying drawings.

Referring to FIGS. 1 to 5 of the drawings, an external range adjusting device of a differential pressure gauge according to a preferred embodiment of the present invention is illustrated, wherein the external range adjusting device comprises an adjusting spring 7, a balance spring 10, an adjusting screw 8 and a slider 9. The adjusting spring 7 is provided at a lower end of a measuring diaphragm 4 as a sensitive element. The balance spring 10 is provided at an upper end of the measuring diaphragm 4. The adjusting screw 8 and the slider 9 are provided at a lower end of the adjusting spring 7. A diaphragm cover 11 is provided at an upper end of the balance spring 10.

The adjusting spring 7 at the lower end of the measuring diaphragm 4 can be compressed by the upper and lower displacement of the slider 9, which is driven by the adjusting screw 8 at the outside of the housing 3, thus affecting the rigidity of the system to change the range of the differential pressure gauge.

In the present invention, the adjusting device makes use of the double-spring (the adjusting spring 7 and the balance spring 10) balance mode. Its maximum range can be set by the adjusting screw 8 at the outside of the housing 3. The rigidity of the double-spring combination adds that of the leaf spring 1 to be the rigidity of the whole system. While clockwise rotating the adjusting screw 8, the slider 9 will go down and the adjusting spring 7 will relax. Accordingly, the rigidity of the system will decrease and the range of the differential pressure gauge will be smaller. While counterclockwise totating the adjusting screw 8, the slider 9 will go up and the adjusting spring 7 will compress tightly. Accordingly, the rigidity of the system will increase and the range of the differential pressure gauge will be larger.

Figure 7:
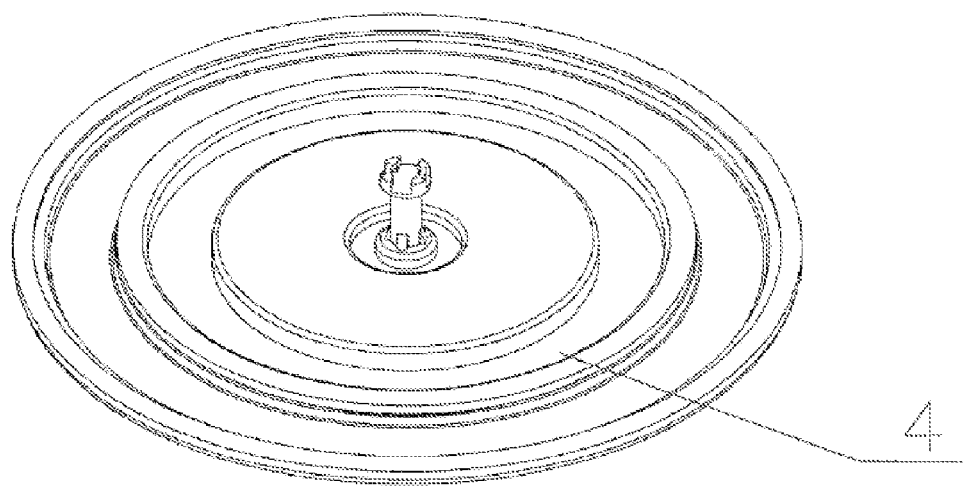
FIG. 7 is a schematic view of an integrated measuring diaphragm in the present invention.

In the present invention, the measuring diaphragm 4 is integrated. The rigidity center and the measuring diaphragm 4 are made to be an integral whole, as shown in FIG. 7.

Figure 3:
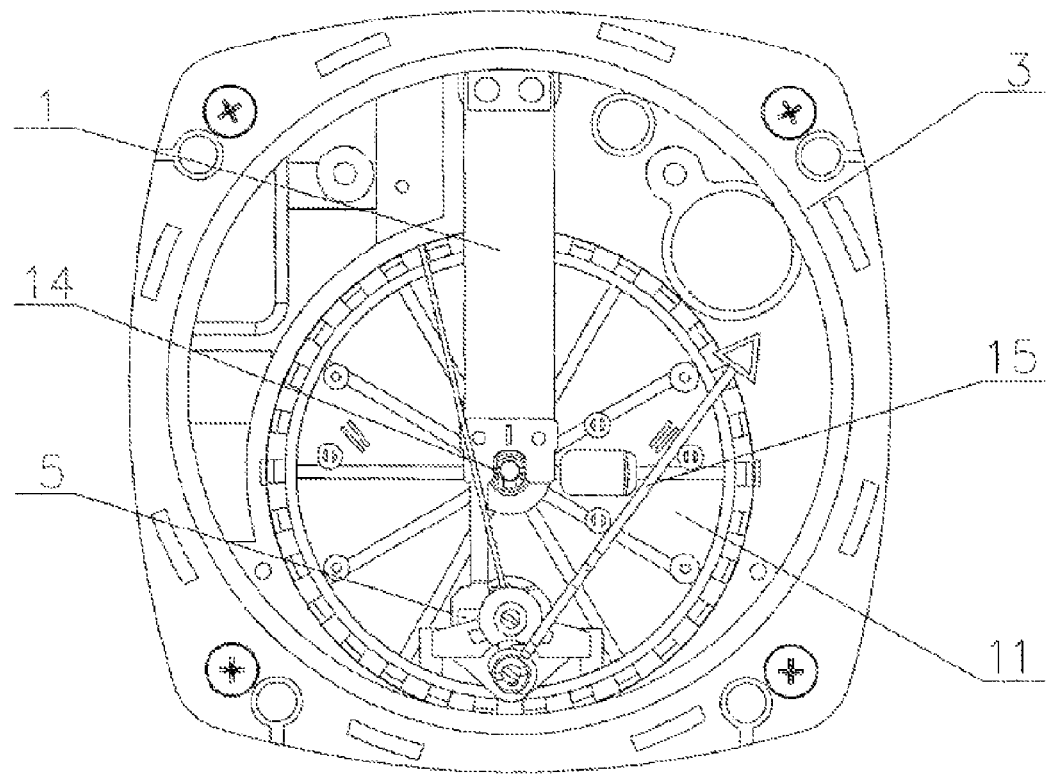
FIG. 3 is a perspective view of a differential pressure gauge in the present invention.
Figure 4:
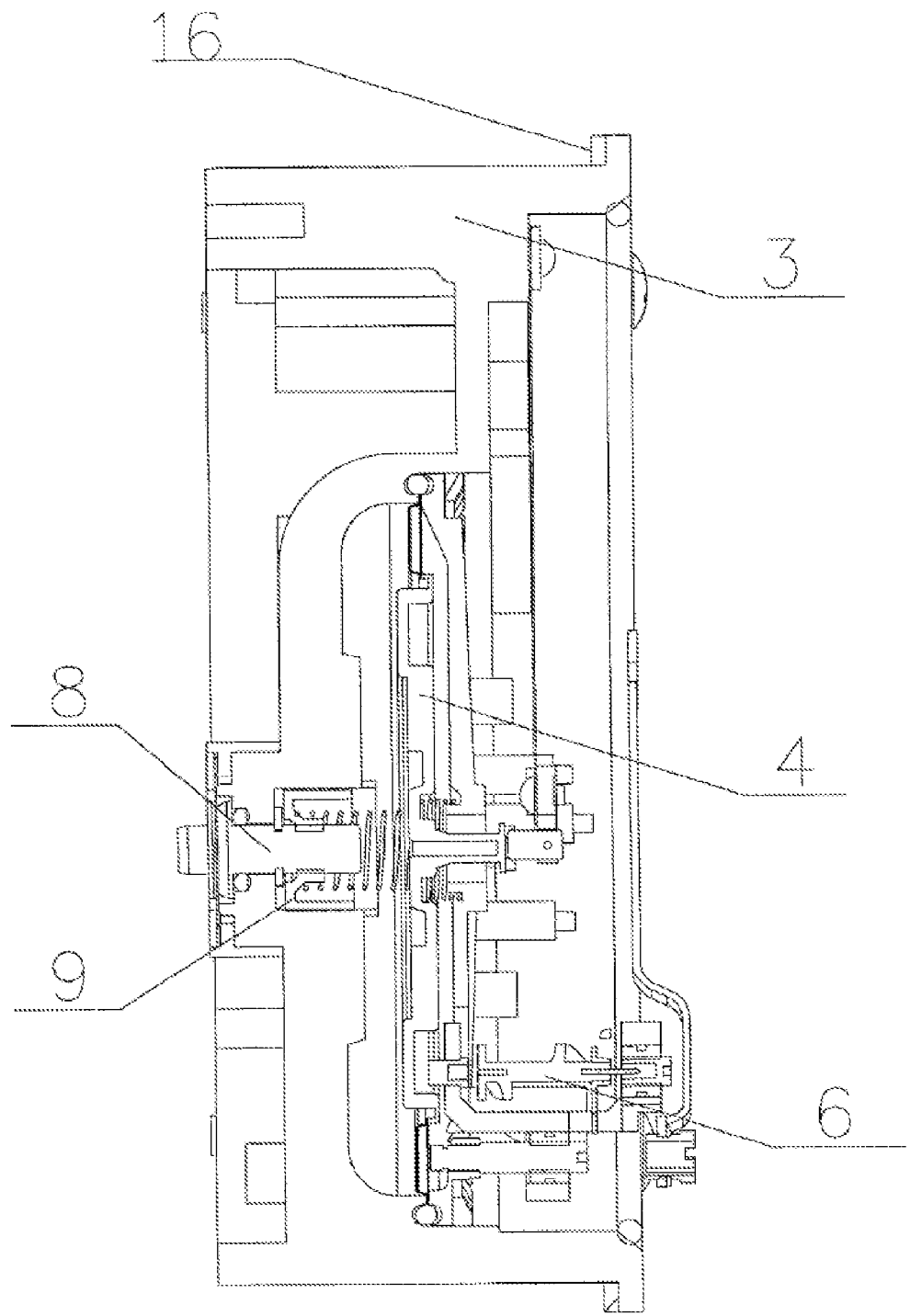
FIG. 4 is a sectional view of the differential pressure gauge in the present invention.
Figure 5:
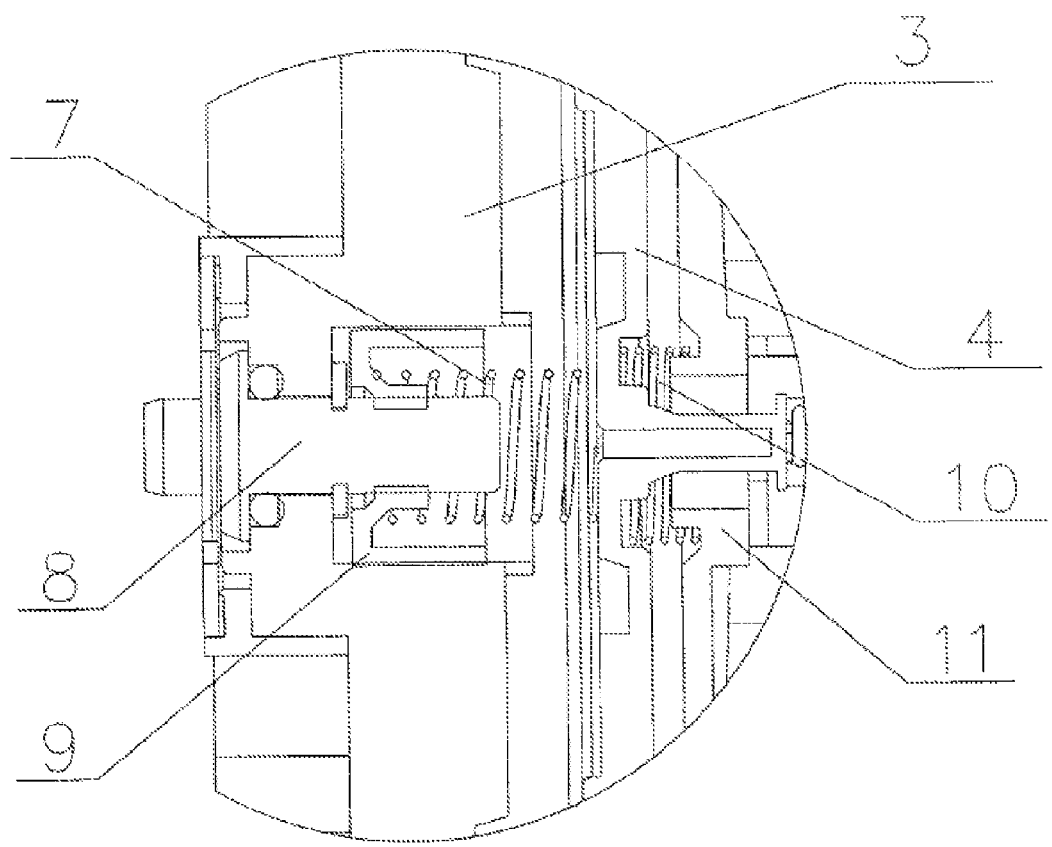
FIG. 5 is a sectional view of an external range adjusting device of the differential pressure gauge in the present invention.

Referring to FIGS. 3 and 4, in the present invention, the center of the measuring diaphragm 4 is hingedly connected with the leaf spring 1 by a pin 14. Furthermore, no traditional small connecting compression spring exists.

Figure 6:
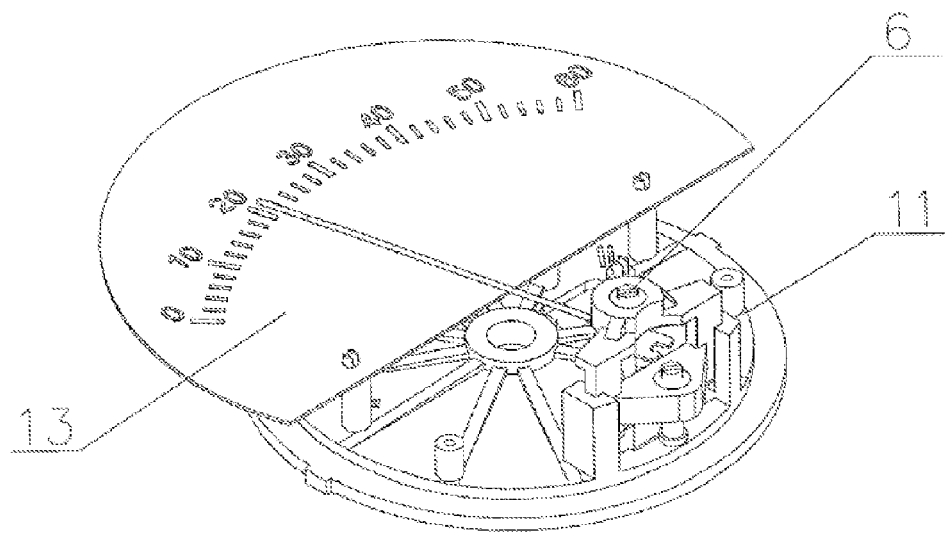
FIG. 6 is a schematic view of a measuring diaphragm cover in the present invention.

Referring to FIG. 6, in the present invention, there are the bracket of the helix 6 and the bracket of the dial 13 on the diaphragm cover 11.

Referring to FIG. 4, in the present invention, there is a sealing gasket 16 at the back of the front flange.

Figure 8:
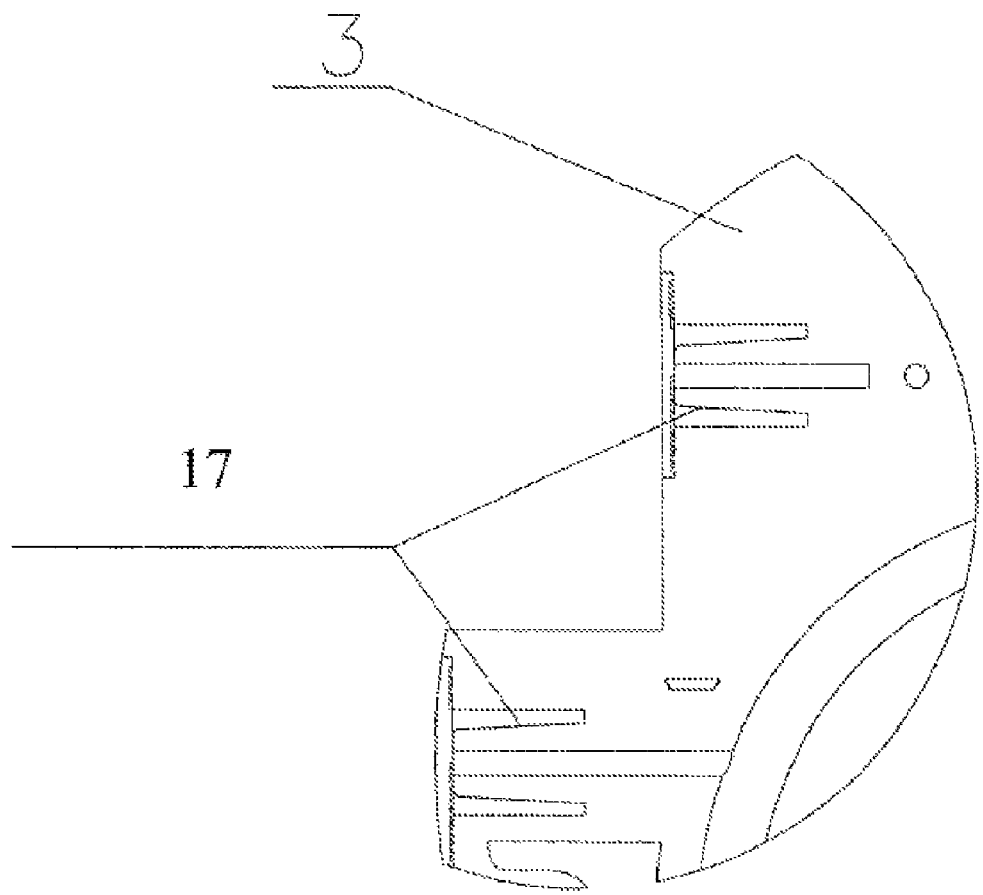
FIG. 8 is a sectional view of a push-on pressure nozzle in the present invention.
Figure 9:
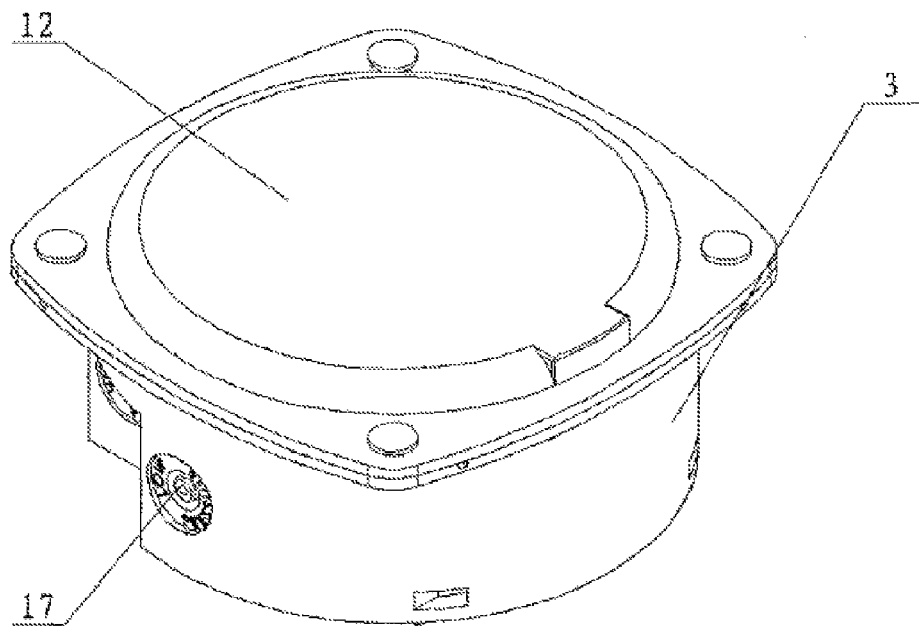
FIG. 9 is a front view of the present invention.
Figure 10:
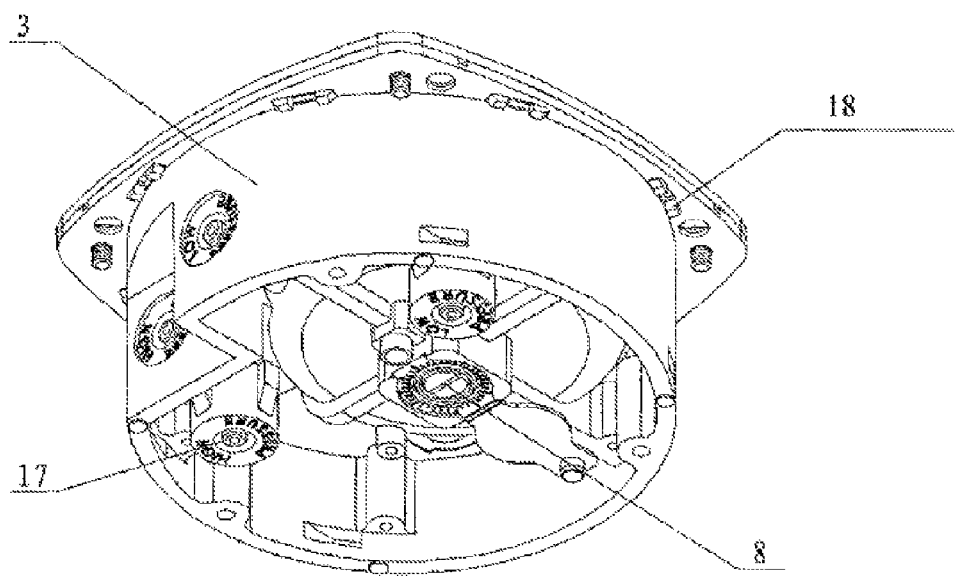
FIG. 10 is a back view of the present invention.

In the present invention, the differential pressure gauge is square in front and round at back. There are four push-on pressure nozzles 17 on the housing. Refer to FIGS. 8 to 10.

In the present invention, there is an adjustable signal flag 15 which is directly fixed with the transparent cover 12. The transparent cover 12 is sealed with the housing 3 by the clamp hook 18. Refer to FIGS. 9 and 10.

In the present invention, the adjusting screw is provided outside of the housing. When the differential pressure gauge has been used for some time, users can easily adjust and calibrate the gauge by themselves. The adjusting screw makes use of its roll to drive the slider. The adjustment is simple, accurate and reliable. The present invention adopts the double-spring balance principle, thereby effectively eliminating the problems of zero drift and linear difference which are produced by the single spring. In the present invention, the pin hinge connection between the diaphragm center and the leaf spring effectively eliminates the measuring error which is produced by the transmission error. The high-integrated structure of the diaphragm cover can effectively ensure that the helix and the axis of the measuring diaphragm are parallel, thereby ensuring the measuring accuracy of the differential pressure gauge. In the present invention, the sealing gasket at the back of the front flange can directly and effectively seal up with the wall, thereby users can install easily. In addition, the push-on pressure nozzles on the housing are convenient for the connection. The adjustable signal flag is fixed with the transparent cover, thereby facilitating the installation and adjustment. Also, it can warn. The simple and effective installation and connection will not affect the performance of the differential pressure gauge during the installation and connection process, thereby ensuring the accuracy of the measurement.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A differential pressure gauge, comprising:
a housing having a pressure nozzle thereon;
a leaf spring, having a magnetic steel, provided within said housing;
a measuring diaphragm connected with said leaf spring and provided within said housing;
a helix, having a pointer, provided within said housing;
a dial provided within said housing;

a range adjusting device, for adjusting a range of said differential pressure gauge, provided on said leaf spring, wherein said range adjusting device comprises:
an adjusting spring provided at a lower end of said measuring diaphragm;
a balance spring provided at an upper end of said measuring diaphragm;
an adjusting screw provided at a lower end of said adjusting spring, wherein an adjusting end of said adjusting screw is provided outside of said housing; and
a slider provided at a lower end of said adjusting spring; and
a diaphragm cover provided at an upper end of said balance spring,
whereby, when a differential pressure acts on said measuring diaphragm, said diaphragm will be out of shape to displace a center thereof, with a movement of said leaf spring having said magnetic steel, said helix having said pointer will turn around under a magnetic induction so that said pointer indicates a pressure value.

2. The differential pressure gauge, as recited in claim 1, wherein said measuring diaphragm is integrated, a center of said measuring diaphragm is pin hingedly connected with said leaf spring.

3. The differential pressure gauge, as recited in claim 1, wherein said diaphragm cover, a bracket of said helix and a bracket of said dial are made to be an integral whole.

4. The differential pressure gauge, as recited in claim 2, wherein said diaphragm cover, a bracket of said helix and a bracket of said dial are made to be an integral whole.

5. The differential pressure gauge, as recited in claim 1, further comprising a transparent cover, an adjustable signal flag fixed on said transparent cover, a front flange, a sealing gasket provided at a back of said front flange, and a clamp hook, wherein said housing is sealed with said transparent cover by said clamp hook, and said housing has four push-on pressure nozzles thereon.

6. The differential pressure gauge, as recited in claim 2, further comprising a transparent cover, an adjustable signal flag fixed on said transparent cover, a front flange, a sealing gasket provided at a back of said front flange, and a clamp hook, wherein said housing is sealed with said transparent cover by said clamp hook, and said housing has four push-on pressure nozzles thereon.

7. The differential pressure gauge, as recited in claim 3, further comprising a transparent cover, an adjustable signal flag fixed on said transparent cover, a front flange, a sealing gasket provided at a back of said front flange, and a clamp hook, wherein said housing is sealed with said transparent cover by said clamp hook, and said housing has four push-on pressure nozzles thereon.

8. The differential pressure gauge, as recited in claim 4, further comprising a transparent cover, an adjustable signal flag fixed on said transparent cover, a front flange, a sealing gasket provided at a back of said front flange, and a clamp hook, wherein said housing is sealed with said transparent cover by said clamp hook, and said housing has four push-on pressure nozzles thereon.

9. The differential pressure gauge, as recited in claim 5, wherein said housing is square in front and round at back, said front end is an end at which said transparent cover is provided.

10. The differential pressure gauge, as recited in claim 6, wherein said housing is square in front and round at back, said front end is an end at which said transparent cover is provided.

11. The differential pressure gauge, as recited in claim 7, wherein said housing is square in front and round at back, said front end is an end at which said transparent cover is provided.

12. The differential pressure gauge, as recited in claim 8, wherein said housing is square in front and round at back, said front end is an end at which said transparent cover is provided.

* * * * *